United States Patent [19]

Christoffel et al.

[11] Patent Number: 5,421,245
[45] Date of Patent: Jun. 6, 1995

[54] PISTON-ARTICULATING PIN-CONNECTING ROD ASSEMBLY FOR RECIPROCATING HERMETIC COMPRESSORS

[75] Inventors: Fernando Christoffel; Ingwald Vollrath; José Fernandes, all of Joinville, Brazil

[73] Assignee: Empresa Brasileira De Compressores S. A. - EMBRACO, Joinville, Brazil

[21] Appl. No.: 211,730

[22] PCT Filed: Aug. 10, 1993

[86] PCT No.: PCT/BR93/00025
§ 371 Date: Jul. 25, 1994
§ 102(e) Date: Jul. 25, 1994

[87] PCT Pub. No.: WO94/04853
PCT Pub. Date: Mar. 3, 1994

[30] Foreign Application Priority Data

Aug. 11, 1992 [BR] Brazil ................... 9203180

[51] Int. Cl.$^6$ ................... F16J 1/14
[52] U.S. Cl. ................... 92/187; 92/231
[58] Field of Search ........... 92/187, 231, 260; 29/888.05, 888.044, 888.038; 403/163, 270, 271, 272

[56] References Cited

U.S. PATENT DOCUMENTS 1,365,263 1/1921 Morton ................... 92/231
4,182,012 8/1980 Block.

FOREIGN PATENT DOCUMENTS 2470311 5/1981 France.

Primary Examiner—F. Daniel Lopez
Attorney, Agent, or Firm—Darby & Darby

[57] ABSTRACT

The assembly is used in a reciprocating hermetic compressor of the type comprising a cylinder block (4), presenting a cylinder (11), within which a piston (20) reciprocates, a smaller eye (31) of a connecting rod (30) being introduced into and retained inside said piston (20), through an articulating pin (40), having its end portions supported on respective radial lateral openings of the piston, wherein the portions, which are defined by the peripheral edge of at least one end of the articulating pin and the adjacent internal surface (23a, 24a) of the respective lateral radial opening (23, 24) of the piston (20), are attached to each other by at least one welding spot contained in a respective first welding region, located in a sector of about 90 degrees of said end and symmetric to a diametral line of said end of the articulating pin (40), said line being parallel and coplanar relative the longitudinal axis of the piston (20), at least one welding spot being provided in at least a second welding region opposite said first welding region, relative a diametral line orthogonal to said first diametral line.

10 Claims, 2 Drawing Sheets

PISTON-ARTICULATING PIN-CONNECTING ROD ASSEMBLY FOR RECIPROCATING HERMETIC COMPRESSORS

TECHNICAL FIELD

The present invention refers to a piston—articulating pin—connecting rod assembly for reciprocating hermetic compressors and to a process for attaching an articulating pin to a piston of a reciprocating hermetic compressor employed in small machines, such as refrigerators, freezers, drinking fountains, etc.

BACKGROUND OF THE INVENTION

The reciprocating compressors present a connecting rod, having a smaller eye, which is articulated, through an articulating pin, to a piston that reciprocates inside the cylinder of the compressor, and a larger eye, mounted to an eccentric end of a crankshaft, which is orthogonal to the piston stroke, the other end of said crankshaft supporting the rotor of an electric motor, whereas the stator of the motor is supported on a cylinder block, lodging the bearing of the crankshaft, the block being mounted inside a case, by means of springs, said case being closed by a cover, which defines a sealed unit.

In order to obtain a better performance of the compressor, it is important, from the mechanical point of view, that the parts with relative movement present perfect adjustments of their geometries, so as to avoid leakage, wear and tribological effects that lead to a loss of volumetric yielding.

The perfection in the geometry of the parts is verified, for example, in the maintenance of the piston cylindricity.

Alterations in this characteristic of the piston affect the operation of the compressor.

The attachment between the pin and the piston in the known techniques (mechanical mounting by interference, resilient pin, gluing, etc.) affects the yielding of the reciprocating compressors, mainly due to the deformations caused by the loss of symmetry and to problems that occur in the piston—pin—connecting rod assembly and cylinder, said problems resulting in vibrations, noises and loss of volumetric yielding (leakages).

The smaller the parts used in the mounting operation, with more precision being required for such parts, the more enhanced will be the above cited deficiencies. Among said known techniques, those which use additional fastening components, such as pins and rings or bonding material, as in the gluing technique, cause localized tensions and, above all, unbalance in the piston—pin—connecting rod assembly, which also impairs the performance of the compressor.

The conventional welding technique, besides presenting the inconvenience of incorporating additional material and causing residues, thereby deforming the piston during the melting operation, should not be applied to materials with different physical characteristics (melting point), such as the tempered or sintered materials. Moreover, this process of fixation is difficult to apply in small systems, as in the case of the hermetic compressors, more specifically in the piston—pin—connecting rod assembly thereof.

The fixation through adhesives, though not presenting the inconvenience of residues, as in the fixation by welding, requires a thorough cleaning of the surfaces to be welded and a determined time for the adhesive cure, which time, in spite of being reduced by the application of catalysts, does not avoid the problems caused to the sequential mounting process of the compressors. Moreover, physical-chemical deteriorations lead to the accelerated aging of the adhesives, as a function of the conditions of the compressor operation, thus substantially reducing its strength and affecting the reliability in the mounting operation of said compressor.

DISCLOSURE OF THE INVENTION

Thus, it is a general object of the present invention to provide a piston—articulating pin—connecting rod assembly which, after being mounted does not present deformations and, consequently, unbalances or vibrations in the hermetic compressor.

Another object of the present invention is to provide a piston—articulating pin—connecting rod assembly, whose mounting operation does not require a prior preparation of the parts that are going to be fastened, such as machining, thereby allowing a sequential mounting operation of said compressors.

Still another object of the present invention is to provide a process for attaching an articulating pin to a piston for reciprocating hermetic compressors, which does not cause deformations or use additional materials or other components that might cause unbalance and vibrations in the piston—articulating pin—connecting rod assembly, thereby affecting the reliability and yielding of the compressor.

A further object of the present invention is to provide a sequential process for attaching an articulating pin to a piston for reciprocating hermetic compressors, which results in a fixation of the piston—articulating pin—connecting rod assembly that is physically and chemically resistant to the operative conditions of the reciprocating hermetic compressors, at least during the useful life of said compressors.

These objectives are attained through a piston—articulating pin—connecting rod assembly for reciprocating hermetic compressors of the type comprising a cylinder block, presenting a bearing for supporting a crankshaft and a cylinder, within which a piston reciprocates, said crankshaft being provided, at its upper portion, with an eccentric end connected to the piston through a connecting rod, whose smaller eye is introduced into and retained inside said piston, through an articulating pin, having its end portions supported on respective lateral radial openings of the piston, said portions, which are defined by the peripheral edge of at least one end of the articulating pin and by the adjacent internal surface of the respective lateral radial opening of the piston, being attached to each other by at least one welding spot contained in a respective first welding region, which includes a portion of the peripheral edge of said end of the articulating pin and which is located in a sector of about 90 degrees of said end and symmetric to a diametral line of said articulating pin end, said line being parallel and coplanar relative the longitudinal axis of the piston, at least one welding spot being provided in at least a second welding region opposite said first welding region, relative a diametral line orthogonal to said first diametral line. This piston—articulating pin—connecting rod assembly is mounted through a process comprising the steps of:

a—introducing the smaller eye of the connecting rod inside the piston;

b—introducing the articulating pin through the lateral radial openings of the piston and smaller eye of the connecting rod;

c—centralizing the articulating pin inside the piston;

d—immobilizing at least one of the ends of the articulating pin against axial displacements relative the piston;

e—positioning the pin-piston assembly relative a quick microwelding apparatus, so as to have at least a welding spot applied to a respective first welding region, including a peripheral edge portion of said articulating pin end contained in a sector of about 90 degrees of said end and symmetric to a diametral line of said articulating pin end, said line being parallel and coplanar relative the longitudinal axis of the piston;

f—energizing the microwelding apparatus during a predetermined time interval, in order to produce said welding spot;

g—deactivating the microwelding apparatus;

h—repeating, if desired, the steps "e–g" in order to obtain additional welding spots on said first welding region;

i—repositioning said apparatus relative the pin-piston assembly, so as to define at least a second welding spot in at least a second welding region opposite said first welding region, in relation to a diametral line orthogonal to the first diametral line.

j—optionally repeating the step "i", in order to obtain further welding spots on said second welding region;

k—deactivating the microwelding apparatus;

l—releasing the piston—articulating pin assembly.

The microwelding technique allows, without adding any materials or components, the welding of the pin-piston assembly, by melting only the portion of the pin-piston surfaces that are adjacent to the respective edges, thus producing very small welding spots and, consequently, submitting said components to such reduced tensions that the piston is not affected, thereby guaranteeing a good performance for the compressor. Moreover, such technique saves energy and permits automatizing the fixation between the articulating pin and piston, for the sequential production of the compressors.

BRIEF DESCRIPTION OF THE DRAWINGS

The invention will be described below, based on the attached drawings, in which.

BEST MODE FOR CARRYING OUT THE INVENTION

Figure 1:
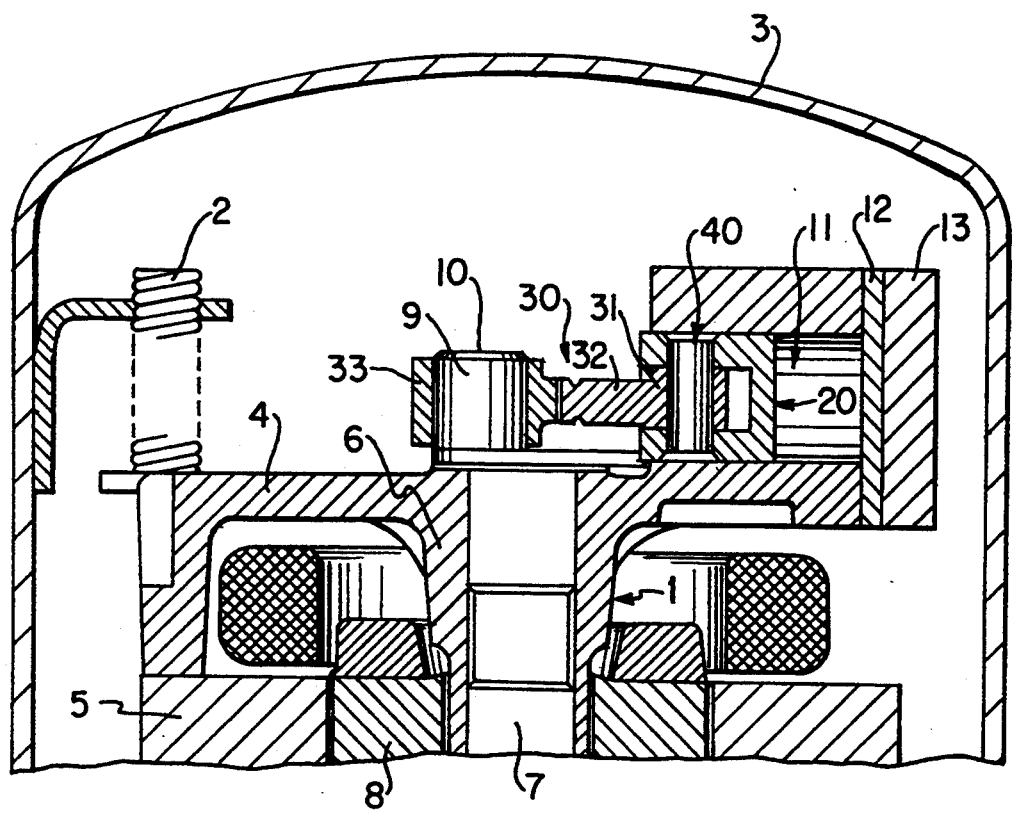
FIG. 1 is a partial schematic longitudinal section view of a reciprocating hermetic compressor.

According to FIG. 1, the motor/compressor unit 1 is suspended inside a case 3, through springs 2 (only one is illustrated). A cylinder block 4 supports a stator 5 of an electric motor and presents a bearing 6 for supporting a crankshaft 7, in which lower portion a rotor 8 of the electric motor is mounted. The crankshaft 7 carries, at its upper end, an eccentric pin 9, whose upper end 10 is free.

The cylinder block 4 also lodges a cylinder 11, in which a piston 20 reciprocates.

Figure 2:
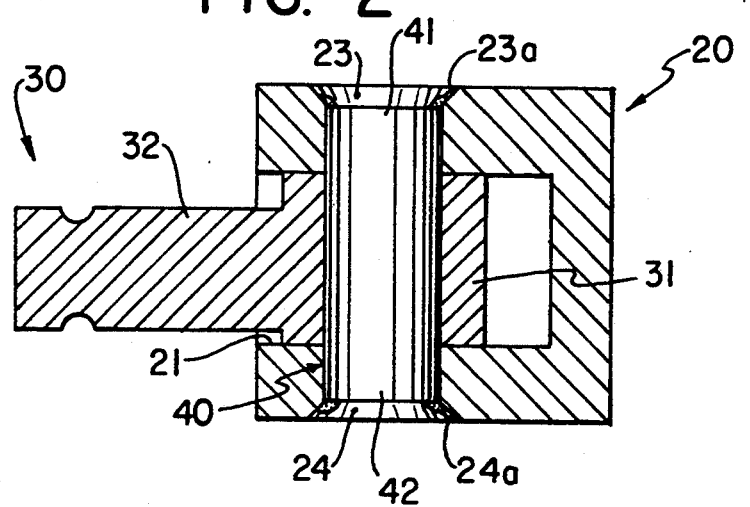
FIG. 2 is an enlarged detail of part of FIG. 1, showing the piston—articulating pin—connecting rod assembly and illustrating two pairs of welding spots, symmetrical to each other, according to the present invention.

As observed in FIGS. 1 and 2, the cylinder 11 is provided, at its end opposite to the crankshaft, with a valve plate 12 and a cover 13, which can be conventionally constructed.

The connection between the piston 20 and the eccentric pin 9 of the crankshaft 7 is made by a connecting rod 30, comprising a smaller eye 31, a radial projection 32 of said eye 31 defining the rod of the connecting rod 30, which is attachable to a larger eye 33. The smaller eye 31 is retained inside the piston 20, through an articulating pin 40, whereas the larger eye 33 is mounted around the eccentric pin 9 of the crankshaft 7. The above illustrated connecting rod 30 is particularly formed of two pieces, though this aspect does not belong to the present invention.

According to FIGS. 1–3c, the piston 20 presents, at one of its end faces, a first opening 21, into which the smaller eye 31 of the connecting rod 30 is introduced and where part of the rod 32 of said connecting rod 30 is loosely fitted.

Said first opening 21 extends through the inside of the body of the piston 20 and communicates with a pair of lateral radial openings 23 and 24, which are diametrically aligned. In the preferred illustrated constructive form, said end openings are circular, with a shape consonant with that of the articulating pin.

Through one of said lateral radial openings 23, 24, the connecting rod—piston assembly receives the articulating pin 40, around which the connecting rod 30 will move between two maximum operational angular positions, defined by the movement of the eccentric pin 9 of the crankshaft 7.

The articulating pin 40 is positioned in such a way that its opposite ends 41, 42 reach, at most, an internal superficial edge 23a, 24a of a respective lateral opening 23, 24 of the piston 20, adjacent the peripheral edge of the respective end opening 23, 24, so as not to impair the cylindricity of said piston. Each opposite end 41, 42 of the articulating pin 40 presents a surface, on which, jointly with the internal superficial edge 23a, 24a of the corresponding end opening 23, 24, two angular welding regions are defined, each being able to receive a determined maximum number of welding spots, which are going to be produced on a welding line L, having a contour substantially consonant with the contour of the respective internal superficial edge 23a, 24a of the piston 20.

Each of said welding regions comprises an angular sector, concentric relative a respective end face of the articulating pin 40 and situated between −45 and +45 degrees, preferably between −15 and +15 degrees, in relation to a diametral line defined at each respective end of the articulating pin 40, said line being parallel and coplanar relative the longitudinal axis of the piston 20. The angular opening of the sector is a function of a minimum distance that said end face of the articulating pin 40 should present in relation to the cylindric contour of the piston, so that the welding spots over the edge of the respective end face of the articulating pin 40 do not cause deformations on the lateral wall of the piston, which would affect its cylindricity.

In the preferred and illustrated constructive form, each welding region receives a respective welding spot, defined on one of the intersection points of said diametral line with the peripheral edge of the end face of the articulating pin 40. At said intersection point, the above cited distance is maximum, thus permitting maximum deformation of the welding spots, without impairing the cylindricity of the piston. In this positioning, the welding spots of each opposite end opening are aligned.

In a non-illustrated embodiment of the invention, one or both hemispheres of each end face of the articulating pin, that are defined by a second diametral line orthogonal to the first diametral line, present two welding regions that are symmetric in relation to said first diametral line, provided that the previously defined limits are obeyed and that the welding spots are not, by any reason, positioned on said first diametral line.

The construction of the pin—piston assembly may provide a previous locking between the articulating pin 40 and the piston 20, by a restriction formed at the surroundings of the superficial edge of one of the openings 23, 24, against which is supported a corresponding end portion of the articulating pin 40, said portion being widened in relation to the remainder of the body of said articulating pin 40.

The superficial edge of the other of said openings 23, 24 may present a region provided with a restriction, as mentioned above and which, although not having the purpose of previous locking the pin and piston, maintains the symmetry and, consequently, the balance of the articulating pin-piston assembly.

The linking of the above cited assembly is achieved, according to the present invention, through a microwelding process, in which a thin beam of a high energetic material, preferably laser, includes over a determined portion of the welding region, thus supplying high concentrated energy during a time interval, which is short but sufficient to cause a localized superficial melting, thus defining a welding spot between said adjacent surfaces.

Figure 3A:
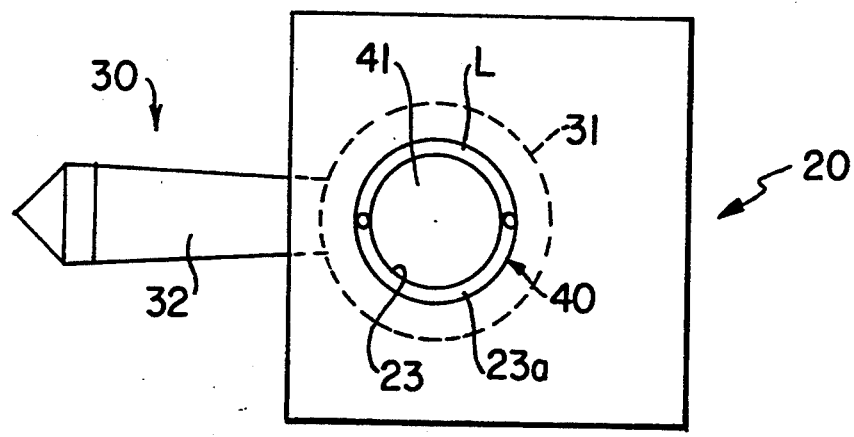
FIGS. 3a, 3b and 3c show a lateral view of the above cited assembly, illustrating a preferred circular portion of the disposition of the articulating pin-piston joining points, with different constructive options for the distribution of the welding spots between the adjacent surfaces of an end of the articulating pin and a respective radial opening of the piston.
Figure 3B:
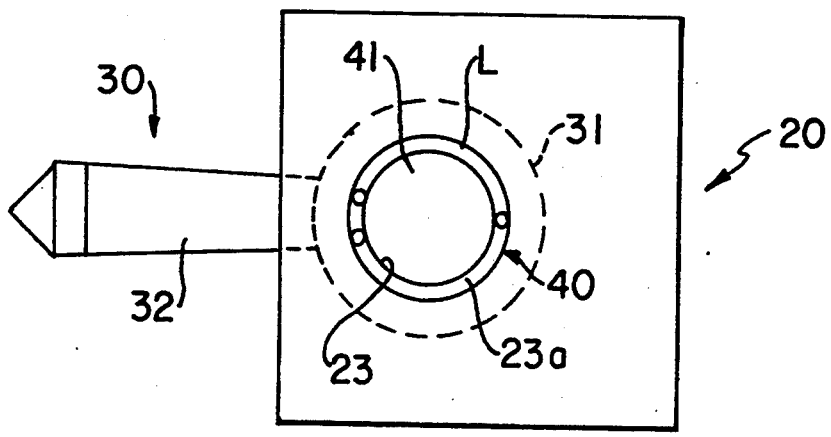
Figure 3C:
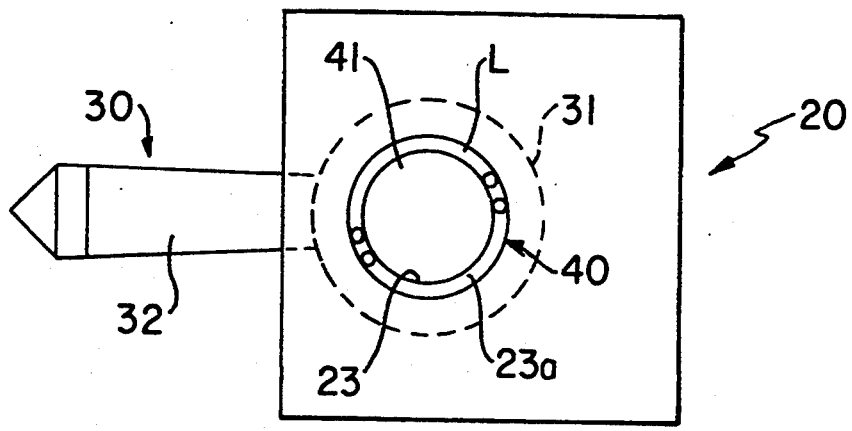

The melting of both adjacent surfaces occurs when the piston 20 and the articulating pin 40 are made of the same material and according to the same constructive technique. If the physical conditions of said parts are different, the microwelding will be achieved, by directing the energetic material beam, in the region of the welding spot, towards the part having the higher melting point, till said melting point is reached. This melted material will spread over the adjacent surface of the other piece to be welded, which is also melting, due to the temperature conditions of the region, thus producing a homogeneous welding. When applied to the articulating pin—piston assembly, the energetic material beam is directed towards the pin, for it is the part of the assembly with the higher melting point. In the case of parts made of very different materials, the energy supply will cause the melting of said adjacent surfaces, although this melting won't result in the linking of said pieces. In this situation, the locking of the pieces, which is obtained through heating, is mechanical. As the melting and cooling processes are slow, the affected region is very small. In another preferred embodiment of the present invention, the welding spots are distributed as illustrated in FIG. 3b, in which one of the welding regions presents a respective welding spot on said first diametral line, which is equidistant from two spots located in another welding region, diametrically opposite relative said above cited region and symmetric to said first diametral line. In another possible embodiment, illustrated in FIG. 3c, the welding spots of a welding region occupy only a portion of a respective welding region defined on the first diametral line, said spots being diametrically disposed relative the respective spots provided in a corresponding portion of a respective welding region diametrically opposite to the aforementioned welding region.

Other combinations of welding spots distributed among portions of respective welding regions are possible, within the technical effect desired with the production of said welding spots. Moreover, the spacing obtained between the welding spots in the same welding region is a function of the higher or lower strength to be achieved by the articulating pin—piston assembly, taking into account the tensions that said welding spots will suffer during the operation of the hermetic compressor, as well as the fragility required in said welding spots, so as to allow a deliberate break of the articulating pin-piston assembly. Therefore, spots separated from each other, spots tangent to each other, or partially overlaying spots are also possible, without departing from the scope of the present invention.

In the positioning for the microwelding operation, the articulating pin 40 should be kept centralized and symmetric relative the lateral radial openings 23, 24 of the piston 20, in order to avoid unbalance and consequent wear of the parts, and also overtension on the welding spots.

After the steps of mounting and positioning the articulatin pin and piston parts, a quick microwelding apparatus is first taken to the surroundings of one of the welding regions of one of the adjacent surfaces of the end openings 23, 24 of the piston 20 and respective end surfaces 41, 42.

The welding spots are obtained by the relative movement between the quick microwelding apparatus and the articulating pin-piston assembly. In one embodiment of the present invention, said articulating pin-piston assembly remains stationary, while the quick microwelding apparatus moves following at least an angular path, whose angle relative the center of the corresponding end surface of the articulating pin 40 is a function of the number and position of the welding spots in each welding region, and of the melting point of the articulatin pin—piston assembly.

The welding of the welding spots at the opposite end of the articulating pin—piston assembly may occur, by moving said apparatus to a new position in front of said other opposite end, or by a corresponding rotation of said articulating pin-piston assembly, in order to achieve said new position.

After the quick microwelding apparatus is positioned against the welding region that is going to receive the energetic beam, a triggering means is actuated, energizing said apparatus, which starts the energetic emission of said beam. This emission is localized and lasts for a time interval sufficient to cause a small local deformation, creating a TAZ (thermically affected zone) of reduced dimensions.

In a welding operation, the TAZ determines the degree of deformation suffered by the parts and, the higher these values, the larger will be the deformation and the tension to which the welding region will be submitted and, consequently, higher will be the chances of material crack in these regions.

After the energetic beam has been applied to the welding regions of one of the ends 23, 24 of the articulating pin—piston assembly, the quick microwelding apparatus is deactivated, either manually or mechanically, and the articulating pin-piston assembly and the quick microwelding apparatus are repositioned, so as to permit the microwelding in the welding region of the other of said ends 23, 24.

In a preferred non-illustrated embodiment, the microwelding of each welding region of a first end of rotation, through a predetermined angle, of said articulating pin-piston assembly around its longitudinal axis. After the microwelding in the welding regions of said first end has finished, the articulating pin-piston assembly may suffer a rotation around its axis, transversal to the longitudinal axis of the piston, said rotation being necessary so that the welding spots of the other of said end openings can also be microwelded.

A constructive alternative of this solution presents two quick microwelding apparatus, aligned with a respective end of the articulating pin 40, thereby avoiding relative movements of repositioning between said articulating pin and quick microwelding apparatus. In another possible embodiment, the articulating pin-piston assembly is kept in only one position during the whole microwelding operation of a determined end, in this case the fixation apparatus acting onto said end of the already welded surface. After this operation, the positioning of said quick microwelding apparatus and said articulating pin-piston assembly can be achieved through one of the operations described above. As the microwelding does not require a cooling period, when the welding of the welding spots of all the regions of each opening has been executed, said fixation apparatus releases the articulating pin-piston assembly.

The microwelding allows the articulating pin-piston linking be strong enough to keep the assembly united during a time interval, at least equal to the useful life of the compressor, resisting to the environmental conditions of temperature variation and corrosion existing inside a compressor, and weak enough to allow the intentional break of the welding region, as well as the extraction, with no resistance of the articulating pin 40, without affecting the other parts of the compressor.

We claim:

1. A piston-articulating pin-connecting rod assembly for reciprocating hermetic compressors comprising a cylinder block, containing a bearing for supporting a crankshaft and a cylinder, within which a piston reciprocates, said crankshaft being provided at its upper portion with an eccentric end connected to the piston through a connecting rod, whose smaller eye is introduced into and retained inside said piston through an articulating pin having its end portions supported on respective lateral radial openings of the piston, wherein the portions which are defined by the peripheral edge of at least one end of the articulating pin and the adjacent internal surface of the respective lateral radial opening of the piston are attached to each other by at least one welding spot contained in a respective first welding region, which includes a portion of the peripheral edge of said end of the articulating pin located in a sector of about 90 degrees of said end and symmetric to a diametral line of said end of the articulating pin, said line being parallel and coplanar relative to the longitudinal axis of the piston, at least one welding spot being provided in at least a second welding region opposite said first welding region, relative to a diametral line orthogonal to said first diametral line.

2. The assembly of claim 1, wherein each end of the articulating pin-piston assembly contains two welding regions diametrically opposite to each other.

3. The assembly of claim 2, wherein both said welding regions are identical.

4. The assembly of claim 3, wherein each welding region is angularly defined by an angular sector, with 15° for each of the sides of said first diametral line.

5. The assembly of claim 2, wherein at least one of the welding regions contains welding spots equidistant from the diametral line.

6. The assembly of claim 2, wherein the welding spots of the first welding region are equidistant from corresponding welding spots provided on the second welding region.

7. The assembly of claim 6, wherein at least one portion of each welding region, said portion being lateral to said first diametral line, contains at least one welding spot diametrically opposite to a respective welding spot of a portion of the other of said welding regions.

8. The assembly of claim 6, wherein each welding region contains welding spots adjacent to each other.

9. The assembly of claim 6, wherein each welding spot is disposed on said first diametral line.

10. A process for attaching an articulating pin to a piston of a reciprocating hermetic compressor comprising a cylinder block containing a bearing for supporting a crankshaft and a cylinder, within which a piston reciprocates, said crankshaft being provided at its upper portion with an eccentric end connected to the piston through a connecting rod, whose smaller eye is introduced into and retained inside said piston through an articulating pin having its end portions supported on respective lateral radial openings of the piston, comprising the steps of:

(a) introducing the smaller eye of the connecting rod inside the piston;

(b) introducing the articulating pin through the lateral radial openings of the piston and of the smaller eye of the connecting rod;

(c) centralizing the articulating pin inside the piston;

(d) immobilizing at least one of the ends of the articulating pin against axial displacements relative to the piston;

(e) positioning the pin-piston assembly relative to a quick microwelding apparatus, with at least one welding spot being applied to a respective first welding region, including a peripheral edge portion of said articulating pin end contained in a sector of about 90 degrees of said end and symmetric to a diametral line of said articulating pin end, said line being parallel and coplanar relative to the longitudinal axis of the piston;

(f) energizing the microwelding apparatus during a predetermined time interval to produce said welding spot;

(g) deactivating the microwelding apparatus;

(h) optionally repeating the steps "e-f" above to obtain additional welding spots on said first welding region;

(i) repositioning said apparatus relative to the pin-piston assembly, so as to define at least a second welding spot in at least a second welding region opposite said first welding region, in relation to a diametral line orthogonal to the first diametral line.

(j) optionally repeating the step "i" above to obtain further welding spots on said second welding region;

(k) deactivating the microwelding apparatus; and (l) releasing the piston-articulating pin assembly.

* * * * *